United States Patent
Hashimoto

(10) Patent No.: US 8,692,805 B2
(45) Date of Patent: Apr. 8, 2014

(54) COORDINATE INPUT APPARATUS, CONTROL METHOD, AND STORAGE MEDIUM

(75) Inventor: Takayuki Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 570 days.

(21) Appl. No.: 12/955,590

(22) Filed: Nov. 29, 2010

(65) Prior Publication Data
US 2011/0148758 A1 Jun. 23, 2011

(30) Foreign Application Priority Data
Dec. 18, 2009 (JP) ................................. 2009-288416

(51) Int. Cl.
*G09G 5/00* (2006.01)
(52) U.S. Cl.
USPC ...................................... 345/175; 178/18.09
(58) Field of Classification Search
USPC ............ 345/157, 173–177; 178/18.03–18.07; 715/863, 864
See application file for complete search history.

(56) References Cited

U.S. PATENT DOCUMENTS

| | | | | |
|---|---|---|---|---|
| 4,507,557 A | 3/1985 | Tsikos | .......................... | 250/341 |
| 6,429,856 B1 | 8/2002 | Omura et al. | .................. | 345/175 |
| 6,570,103 B1 | 5/2003 | Saka et al. | ................. | 178/18.01 |
| 7,456,824 B2 * | 11/2008 | Yoshimura | ..................... | 345/173 |
| 7,525,536 B2 * | 4/2009 | Kobayashi | ..................... | 345/173 |
| 2011/0032185 A1 * | 2/2011 | Yamamoto et al. | ........... | 345/157 |
| 2011/0148758 A1 * | 6/2011 | Hashimoto | .................... | 345/157 |

FOREIGN PATENT DOCUMENTS

| | | |
|---|---|---|
| JP | 2000-105671 | 4/2000 |
| JP | 2001-142642 | 5/2001 |
| JP | 2005-276019 | 10/2005 |

* cited by examiner

*Primary Examiner* — Tom Sheng
(74) *Attorney, Agent, or Firm* — Fitzpatrick, Cella, Harper & Scinto

(57) ABSTRACT

A coordinate input apparatus for making an input by bringing a pointing device into contact with an input area of an apparatus main body is provided, wherein the pointing device comprises: a timer configured to generate a transmission cycle by timekeeping; a detection unit configured to detect the presence/absence of an input instruction according to the presence/absence of contact of the pointing device with the input area; wherein when the detection unit detects the presence of the input instruction, and then detects the absence of the input instruction, the timer continues timekeeping of the transmission cycle during a predetermined holding period.

9 Claims, 16 Drawing Sheets

F I G. 8
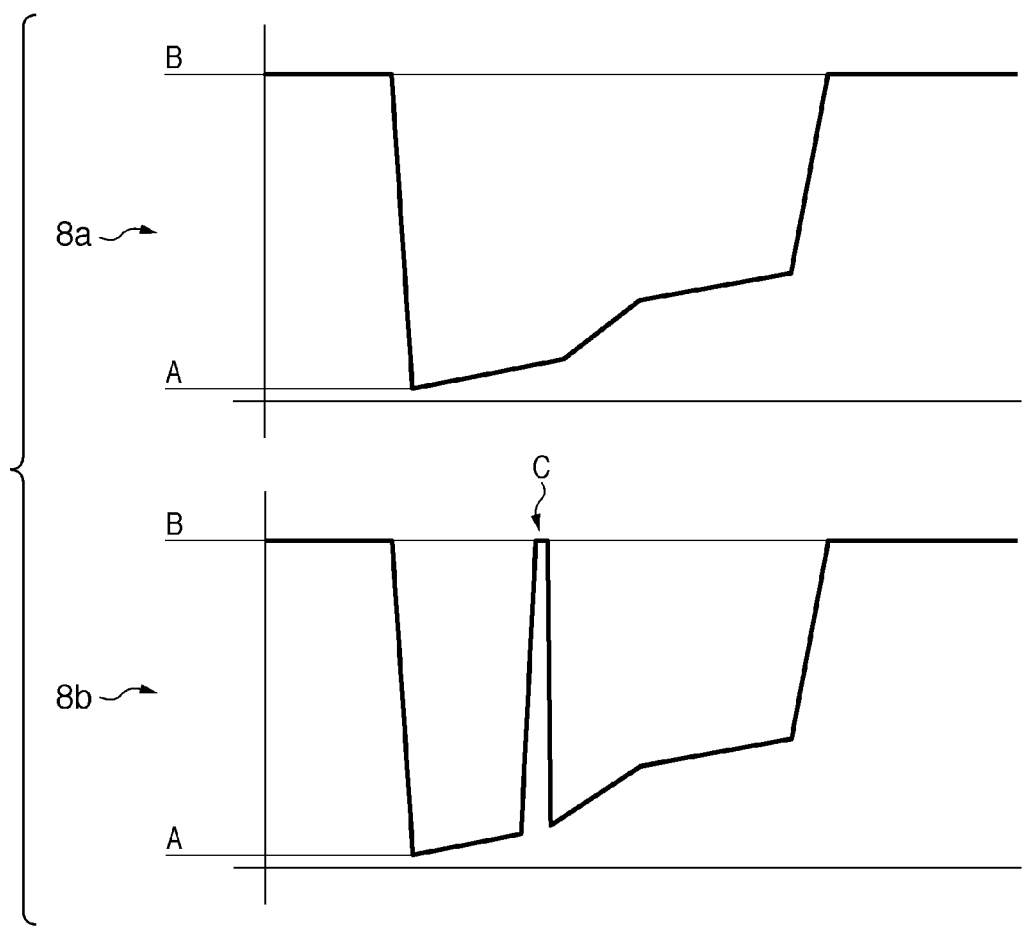
F I G. 9
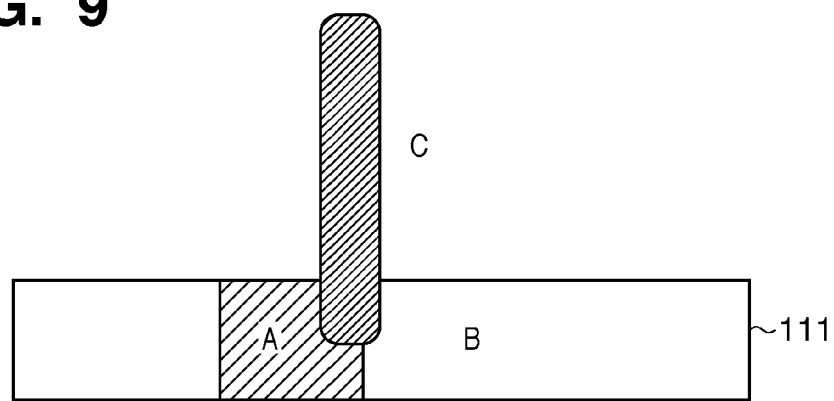

F I G. 10
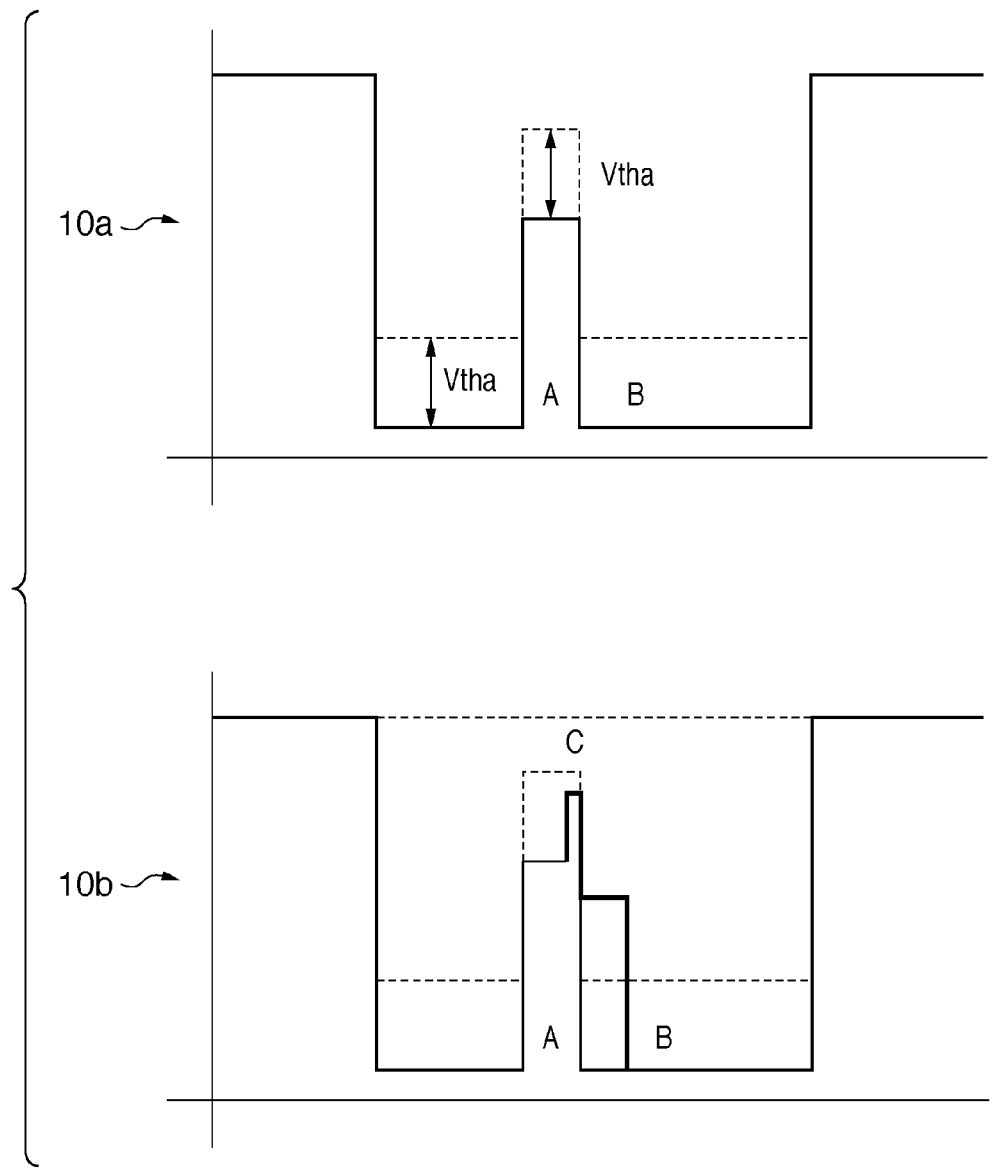

F I G. 11
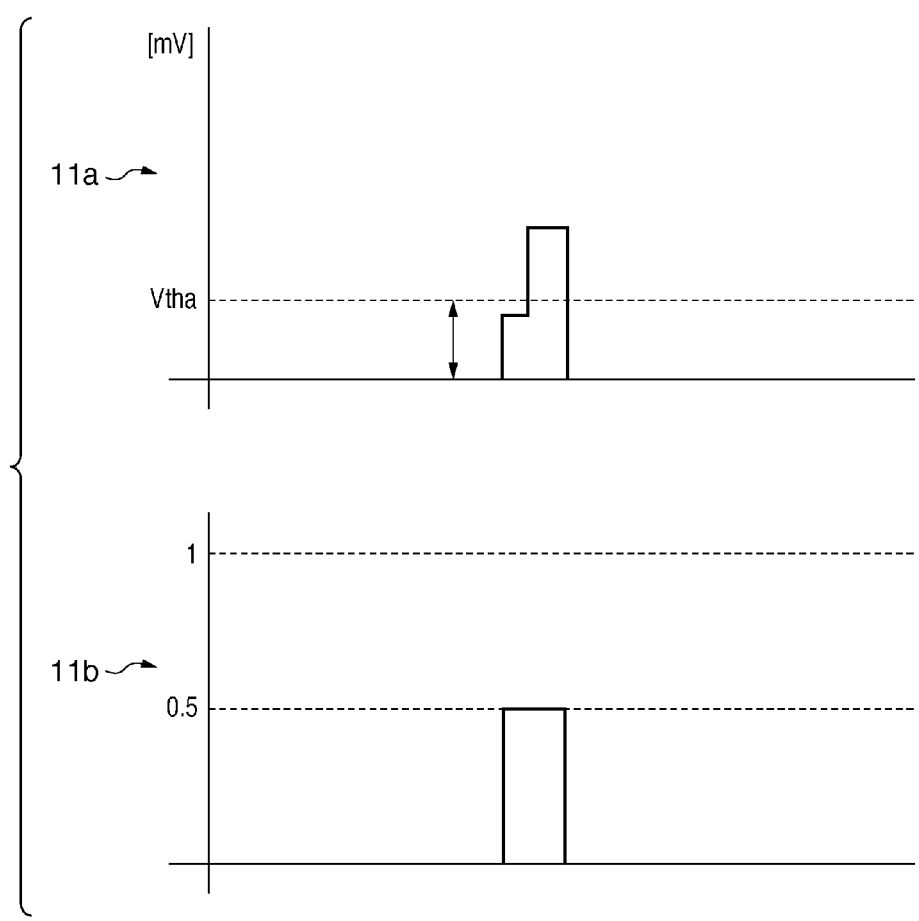

F I G. 14
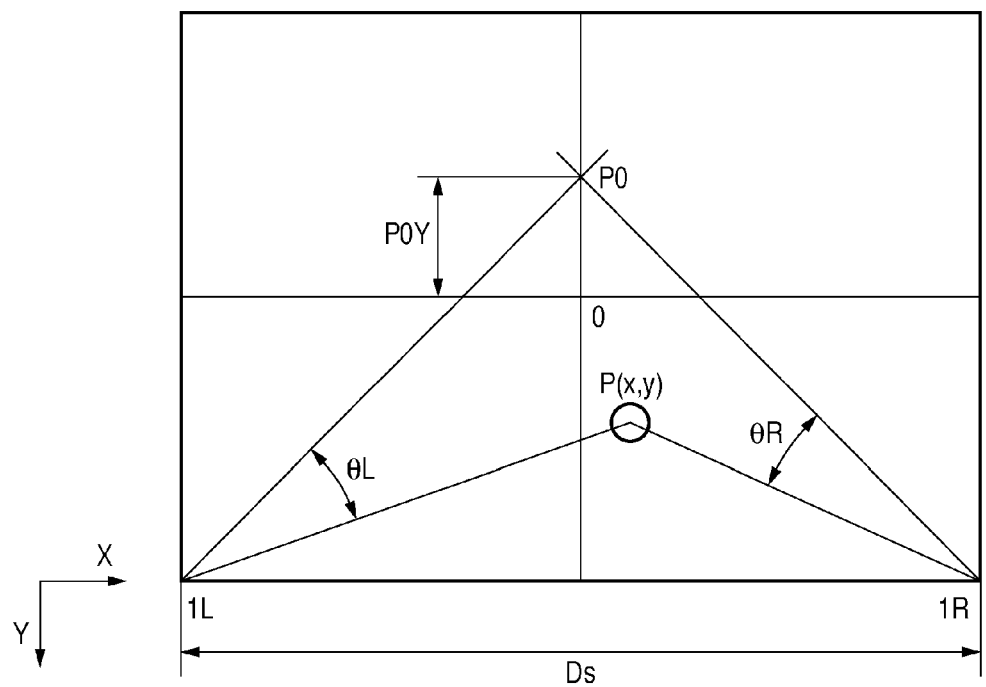

F I G. 18
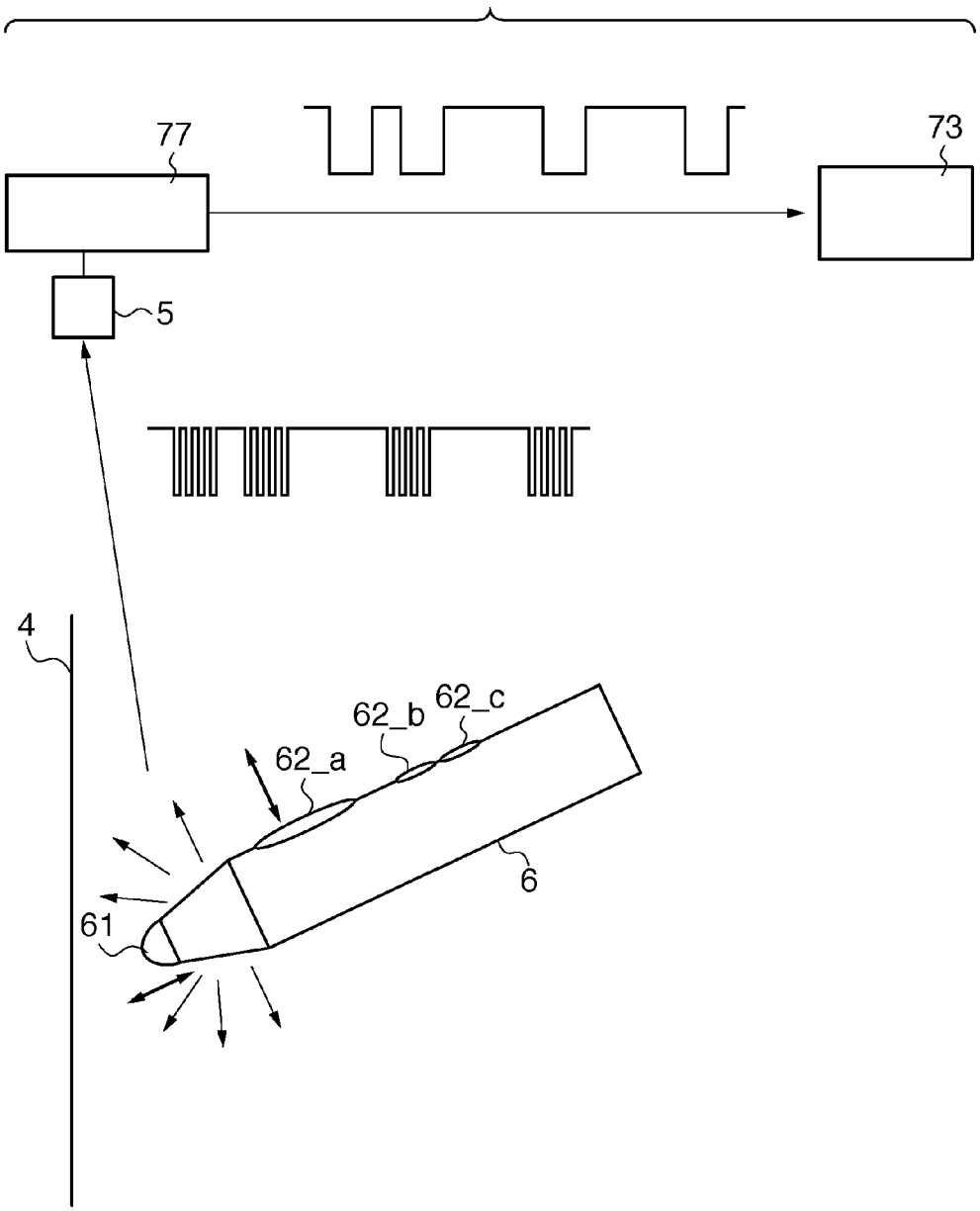

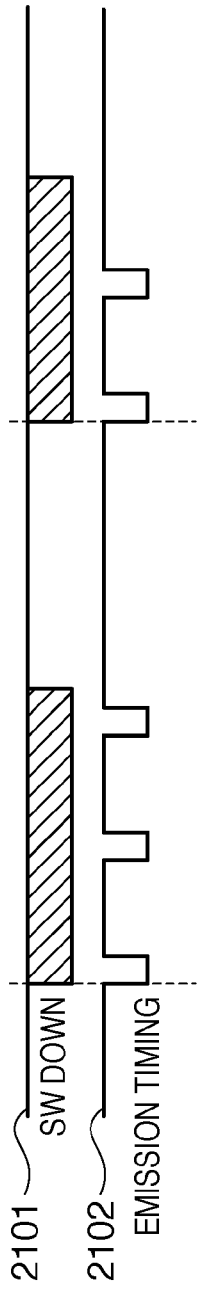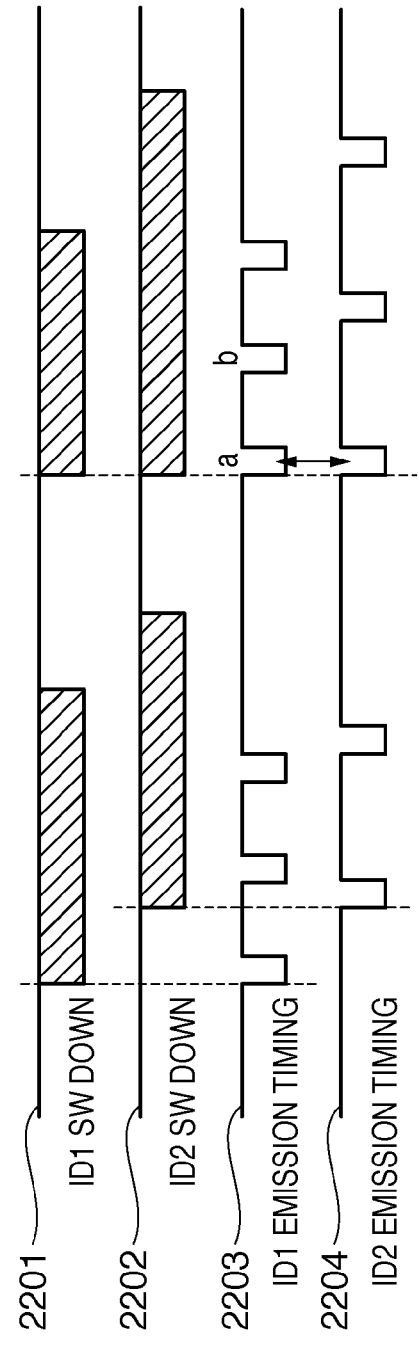

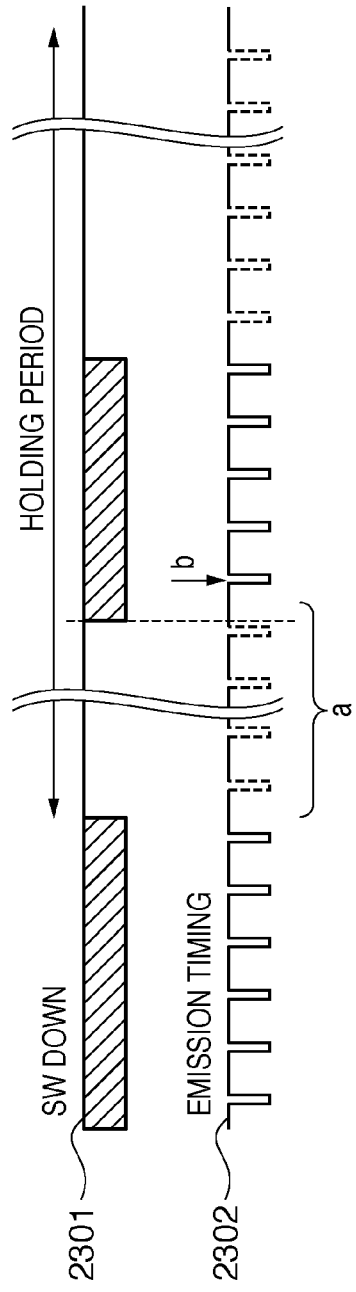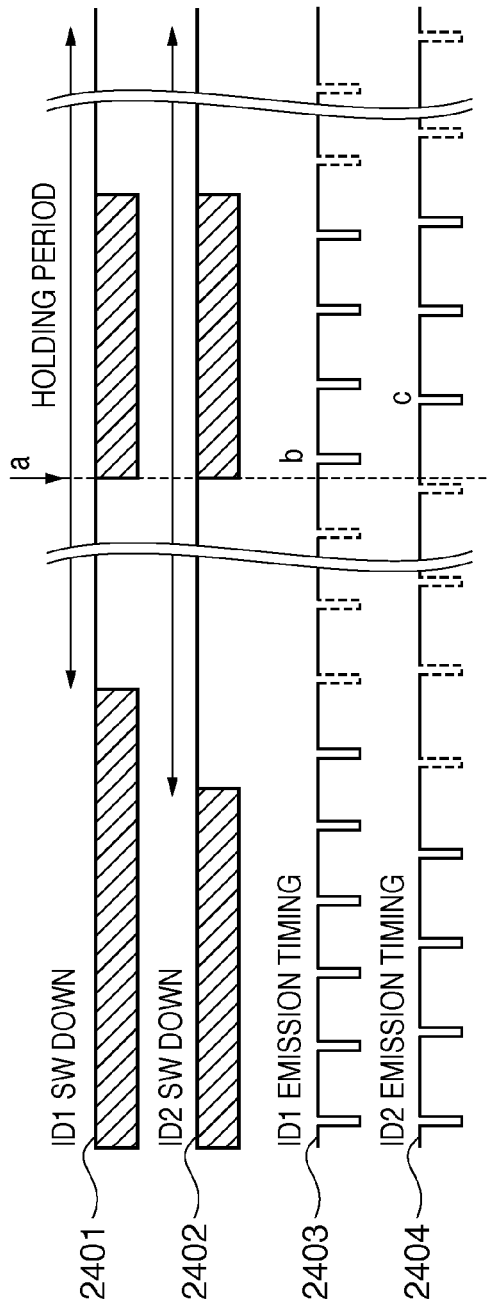

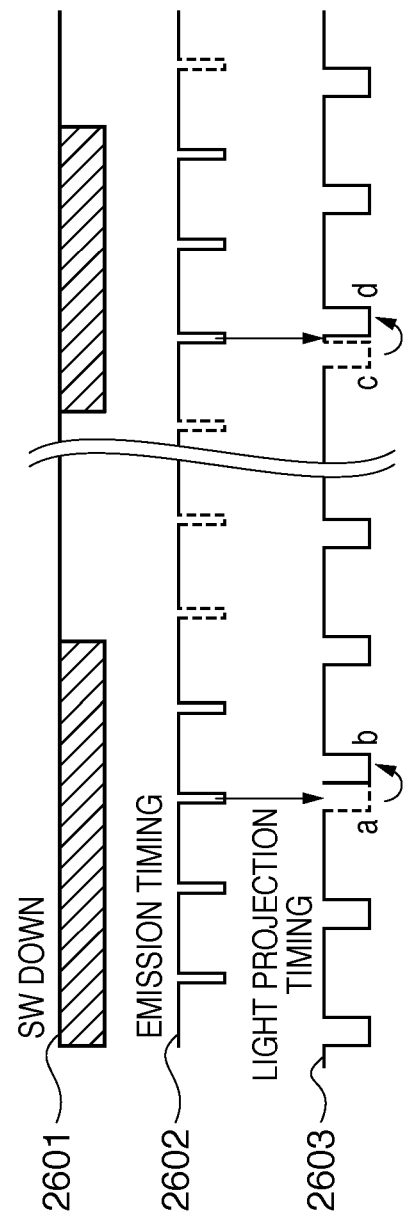

COORDINATE INPUT APPARATUS, CONTROL METHOD, AND STORAGE MEDIUM

BACKGROUND OF THE INVENTION

1. Field of the Invention

The present invention relates to a technique to input coordinate information by pointing a position on an input surface.

2. Description of the Related Art

Conventionally, a coordinate input apparatus (for example, a touch panel apparatus), which inputs coordinate information when the user points a position on an input surface by his or her finger or a pointing device has prevailed. Based on the coordinate information input in this way, a connected computer can be controlled, or a character or figure can be written.

For example, it is a common practice to use a touch panel apparatus as a surface of, for example, a rear projector, front projector, or plasma display panel, and to display, for example, a screen of a personal computer (PC) on that surface. In such a system, the user can operate the PC by his or her finger or a pointing device via the touch panel apparatus. Also, such a system can realize a large-scale interactive display apparatus which allows the user to input handwritten traces. Such large-scale apparatus allows a usage method that is similar to a so-called whiteboard. For example, an application that displays a drawn trace runs on a PC connected to a display, and a trace input by the user by his or her finger or a pointing device can be displayed.

As a coordinate input method in the conventional coordinate input apparatus, various methods such as that using light, that using a resistive film, that using ultrasonic waves, and that using a capacitance are available. For example, as a coordinate input method using light, a light interruption method is known. In this method, a retro-reflective sheet is provided to the outer side of a coordinate input surface, and light projected from a light projecting unit is reflected by the retro-reflective sheet, and a light amount distribution is detected by a light receiving/detecting unit. According to this method, an angle of an area interrupted by an interrupting object such as a finger located within an input area is detected, thus detecting coordinates of the interrupted position, that is, an input position (for example, see U.S. Pat. No. 4,507,557, and Japanese Patent Laid-Open Nos. 2000-105671 and 2001-142642).

For example, according to U.S. Pat. No. 4,507,557, a peak value corresponding to a portion interrupted by an interrupting object in the light receiving unit is detected by a waveform processing operation such as a differential, thereby detecting an angle of the light-interrupted portion with respect to the light receiving unit. Then, based on this detection result, coordinates of the interrupting object are calculated. Also, Japanese Patent Laid-Open No. 2000-105671 describes a technique for detecting coordinates of one end and the other end of a light-interrupted portion by comparison with a specific level pattern, and detecting their center.

Since in the aforementioned use mode such as a whiteboard writing characters and drawing pictures are main purpose, an input to the coordinate input apparatus normally uses a pointing device that imitates a pen. The pointing device of this type (to be referred to as a pen hereinafter) has a switch at its pen tip. In case of a writing operation, when the pen tip is brought into contact with an input area of the coordinate input apparatus (to be referred to a main body hereinafter), that switch is enabled (ON). The ON/OFF operations of the switch notifies the main body of a pen down state (a state in which the pen is in contact with the input area) and device identification information (ID). Furthermore, the side surface of the pen (pen side) may also have switches to which various functions such as a function corresponding to a right button of a mouse and a page feed function are assigned.

When the pen tip emits light at a pressing timing of each switch, data is transmitted to the main body. When the coordinate input method of the main body is the aforementioned light interruption method, a light projection by the light projecting unit and a light emission of the pen may often occur simultaneously. In this case, it becomes difficult for the light receiving/detecting unit to detect a correct light-interrupted signal. Then, input coordinates cannot be calculated and, for example, a drawing line may be interrupted, resulting in poor operability.

In order to avoid such superposition of light emissions, a method of setting a light emission cycle of the light projection by the light projecting unit and that of the pen to be different from each other is known (for example, see Japanese Patent Laid-Open No. 2005-276019). According to this method, the light emission cycle of the pen is decided based on the light projection cycle and period of the light projection, a detection period of the light projection or pen light emission by the light receiving/detecting unit, and the light emission cycle of the pen light emission. Furthermore, the pen light emission cycle is controlled not to match an integer multiple of the light projection cycle. The detection result by the light receiving/detecting unit is established after a plurality of times of light projections. Then, the pen light emission and light projection can be avoided from occurring at the same time, thus preventing missing of any pen signal detection.

In the aforementioned use mode such as a whiteboard in, for example, a meeting room, it is desired to allow a plurality of operators to simultaneously make inputs. Hence, a coordinate input apparatus that copes with a plurality of simultaneous inputs has also been designed.

However, when inputs using a plurality of pens are to be made on the coordinate input apparatus, a plurality of pen down events may occur simultaneously. In this case, the following problems are posed. In general, the pen light emission cycle starts simultaneously with a pressing event of each of switches (pen tip switch and pen side switches), and ends simultaneously with a pen up event (the pen is separated from the input area). Therefore, even when the plurality of pens respectively have different light emission cycles, if simultaneous pen down events of the plurality of pens occur, their light emissions start at the same time. That is, the initial light emissions occur at the same time. When the simultaneous light emissions have occurred in this way, since light signals each indicating up/down information and device identification information of a pen are superposed with each other, correct bit sequences cannot be restored. For this reason, since an ID required to identify each pen cannot be assigned to detected coordinates in the initial light emissions, a delayed coordinate output, that is, a low writing response occurs.

Even in the method of setting different light emission cycles of the light projecting unit and pen in Japanese Patent Laid-Open No. 2005-276019, that light emission cycle starts simultaneously with a pressing event of the pen tip switch or pen side switch, and ends simultaneously with a pen up event. That is, this method cannot avoid superposition of the initial light emissions at the time of pen down events. Therefore, this method is premised on a delay of coordinate detection, that is, a low response at the beginning of writing (writing response).

The aforementioned problems of superposition of light emissions due to the simultaneous pen down events and that of the main body light projection and pen light emission are caused because light is emitted simultaneously with pen down events, since new light emission cycles start at the time of the pen down events after pen up events.

Hence, in order to avoid superposition of light emissions of the pens when the plurality of pens are used, and that of the pen light emission and main body light projection, a method of controlling to set different light emission timings by synchronizing the main body of the coordinate input apparatus with the plurality of pens may be used. However, when they are connected by cables, for example, in order to synchronize the main body with the pens, free movements of the pens are impaired, resulting in poor input operability. Also, a method of always exchanging sync signals wirelessly may be used. However, in this case, the service life of a battery especially on the pen side becomes so short as to pose a practical issue.

SUMMARY OF THE INVENTION

The present invention has been made to solve the aforementioned problems, and provides a coordinate input apparatus having the following functions and a control method thereof. That is, the present invention allows a light emission at the same timing as the previous timing, when an input instruction by a pointing device is interrupted and another input instruction is generated again.

The present invention allows simultaneous inputs made by a plurality of pointing devices to be appropriately detected without impairing any writing response at the beginning of writing.

Also, the present invention can improve the detection precision by avoiding collisions between a light projection required for coordinate detection and a pen light emission, without impairing any writing response.

As one means for solving the aforementioned problems, a coordinate input apparatus of the present invention comprises the following arrangement.

According to one aspect of the invention, a coordinate input apparatus for making an input by bringing a pointing device into contact with an input area of an apparatus main body is provided, wherein the pointing device comprises: a timer configured to generate a transmission cycle by timekeeping; a detection unit configured to detect the presence/absence of an input instruction according to the presence/absence of contact of the pointing device with the input area; and a transmission unit configured to transmit information including the input instruction to the apparatus main body via an optical communication in accordance with the transmission cycle generated by the timer when the detection unit detects the presence of the input instruction, and to skip transmission to the apparatus main body when the detection unit detects the absence of the input instruction, wherein when the detection unit detects the presence of the input instruction, and then detects the absence of the input instruction, the timer continues timekeeping of the transmission cycle during a predetermined holding period, and when the detection unit detects the absence of the input instruction, and then detects the presence of the input instruction within the holding period, the transmission unit performs transmission according to the transmission cycle generated based on timekeeping continued by the timer.

According to the present invention with the aforementioned arrangement, when an input instruction by a pointing device is interrupted and another input instruction is generated again, light can be emitted at the same timing as the previous timing.

Even when simultaneous inputs are made by a plurality of pointing devices, they can be appropriately detected without impairing any writing response at the beginning of writing.

By avoiding collisions between a light projection required for coordinate detection and a pen light emission without impairing any writing response, the detection precision can be improved.

Further features of the present invention will become apparent from the following description of exemplary embodiments (with reference to the attached drawings).

BRIEF DESCRIPTION OF THE DRAWINGS

FIG. 8 shows graphs of light amount distributions before and after a pen input;

FIG. 9 is a view illustrating a pen input state;

FIG. 10 shows graphs of detection examples of light amount distributions;

FIG. 11 shows graphs of a change amount and change ratio of light amount distributions;

FIG. 14 is a view showing the relationship between the sensor units and a coordinate system;

FIG. 18 is a view illustrating switch signal detection by the pen;

FIG. 19 is a timing chart showing a pen input according to a related art;

FIG. 20 is a timing chart showing inputs by a plurality of pens according to the related art;

FIG. 21 is a timing chart showing a pen input according to the embodiment;

FIG. 22 is a timing chart showing inputs by a plurality of pens according to the embodiment;

FIG. 24 is a timing chart showing a pen input according to the second embodiment.

DESCRIPTION OF THE EMBODIMENTS

Embodiments of the present invention will be described hereinafter with reference to the drawings. Note that the embodiments to be described hereinafter do not limit the present invention specified in the appended claims, and all combinations of characteristic features described in the embodiments are not always indispensable as the solving means of the present invention.

First Embodiment

Overview of Apparatus Arrangement

Figure 1:
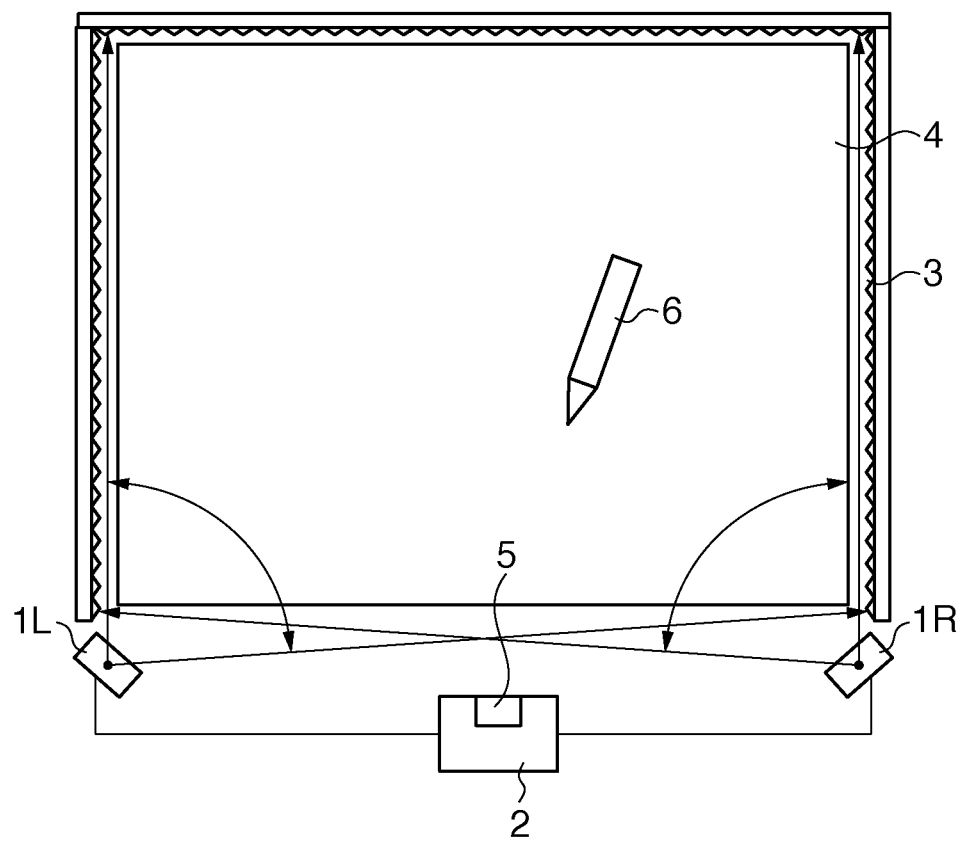
FIG. 1 is a view showing the outer appearance of a coordinate input apparatus according to an embodiment of the present invention.

FIG. 1 is a view showing the outer appearance of a coordinate input apparatus according to this embodiment. An overview of the arrangement of the coordinate input apparatus will be described below using FIG. 1.

Referring to FIG. 1, reference numerals 1R and 1L denote sensor units each having a light projecting unit and detecting unit. These sensor units 1R and 1L are arranged at corners of an input area 4, and are separated from each other by a predetermined distance. These right and left sensor units 1R and 1L will be collectively and simply described as sensor units 1 hereinafter. The sensor units 1 are connected to a main unit 2. The sensor units 1 receive control signals from the main unit 2, and transmit detected signals to the main unit 2. Reference numeral 3 denotes a retro-reflective portion, which has a retro-reflective surface for reflecting incoming light in its direction of incidence. The retro-reflective portion 3 retro-reflects light to the sensor unit 1, where the light is projected within a range of about 90° from the light projecting unit of each of the right and left sensor units 1. Each sensor unit 1 linearly detects light reflected by the retro-reflective portion 3 by the detecting unit, which includes an imaging optical system and line CCD. Then, the sensor unit 1 transmits a light amount distribution of the detected light to the main unit 2.

Reference numeral 4 denotes an input area. When the input area 4 is used as a display screen of a display apparatus such as a PDP, rear projector, front panel, or LCD panel, the display apparatus can be used as an interactive input apparatus.

In the arrangement shown in FIG. 1, when an input instruction is made on the input area 4 by, for example, a finger or pointing device 6, light beams projected from the light projecting units of the sensor units 1 are interrupted, and the detecting units cannot obtain the interrupted retro-reflected light beams. That is, the detecting units cannot obtain light amounts only for a position according to the input instruction of the reflected light beams from the input area 4.

The main unit 2 detects a light-interrupted range corresponding to the input instruction based on changes of light amounts detected by the right and left sensor units 1. Then, the main unit 2 specifies a detection point within the light-interrupted range, and calculates angles of the detection point with respect to the respective sensor units 1. The main unit 2 calculates a coordinate position on the input area based on, for example, the calculated angles and the distance between the sensor units 1. The main unit 2 then outputs the coordinate position to, for example, a PC connected to the coordinate input apparatus via an interface such as USB.

Note that in this embodiment, using the sensor units 1 each including the light projecting unit and detecting unit, light beams from the light projecting units are retro-reflected by the retro-reflective surface provided to the peripheral portion of the coordinate input area, and the retro-reflected light beams are detected by the detecting units. However, the present invention is not limited to such specific arrangement. For example, a surface-emitting illumination unit using a light guide unit may be provided in place of the retro-reflective member. The illumination unit illuminates the coordinate input area with light, and the detecting units detect the light. In case of this arrangement as well, when an input instruction is made on the input area 4 by, for example, a finger, light emitted by the illumination unit is interrupted. Then, since the illumination light in that direction does not detected, an input instruction position can be calculated.

When a dedicated pointing device having a pen down detection switch, which detects a contact to the input area 4, is used in place of a finger as an input unit to the input area 4, an input free from tailing can be made. The pointing device 6 shown in FIG. 1 is an example of such input unit. When the user presses a pen tip switch or pen side switch, an infrared LED built in a pen emits light, thereby transmitting switch information. The pointing device 6 will also be referred to as a pen 6 hereinafter. A light signal transmitted from the pen 6 is detected by a light receiving IC 5, which is a control signal receiving unit having a focusing optical system. The detected signal is sent to the main unit 2, which outputs information indicating, for example, a pen down event together with the aforementioned coordinate information. A PC connected to the coordinate input apparatus receives the coordinate information and switch information indicating, for example, a pen down event from the main unit 2. Then, the PC allows to draw lines and characters on the display screen or to make icon operations.

Respective components in the coordinate input apparatus of this embodiment will be described in detail below.

Sensor Unit

The arrangements and operations of the light projecting unit and light receiving unit of each of the sensor units 1R and 1L of this embodiment will be described in detail below.

Figure 2:
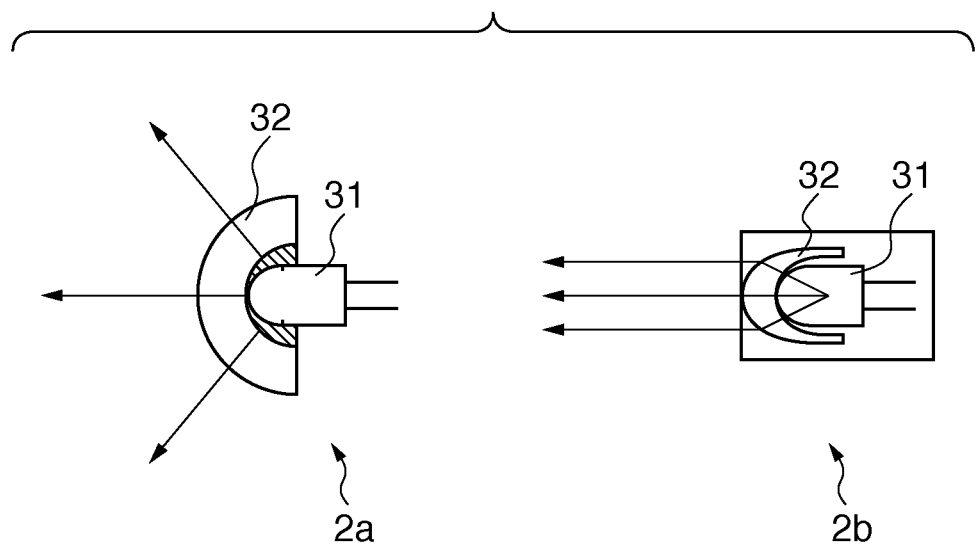
FIG. 2 shows is a view showing the arrangement of a light projecting unit.

FIG. 2 shows an example of the arrangement of the light projecting unit of the sensor unit 1. 2a is a top view of the light projecting unit (in a vertical direction with respect to an input surface). Referring to FIG. 2, reference numeral 31 denotes an infrared LED which emits infrared light. Light emitted by the infrared LED 31 is projected by a projection lens 32 within a range of about 90°. 2b is a side view of the light projecting unit which is the same as 2a (in a horizontal direction with respect to the input surface). As shown as 2b, in this direction, the light from the infrared LED 31 is projected as a light beam restricted in the upper and lower directions. The light projecting unit is configured so that light becomes incident mainly on the retro-reflective portion 3.

Figure 3:
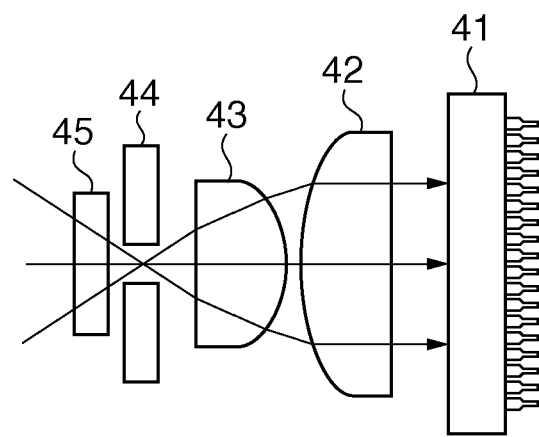
FIG. 3 is a view showing the arrangement of a light receiving/detecting unit.

FIG. 3 is a top view of the detecting unit of the sensor unit 1 (in a vertical direction with respect to the input surface). As shown in FIG. 3, the detecting unit comprises a one-dimensional line CCD 41, lenses 42 and 43 which form an imaging optical system, a stop 44 which limits a direction of incidence of incoming light, and an infrared filter 45 which prevents incidence of extra light such as visible light. Light projected by the light projecting unit is reflected by the retro-reflective portion, and passes through the infrared filter 45 and stop 44. Light from the input surface within the range of about 90° is imaged by the imaging lenses 42 and 43 on pixels depending on an angle of incidence of a detecting surface of the CCD 41. As a result, the light amount distribution for each angle is obtained. That is, pixel numbers on the CCD 41 express angle information. Note that the arrangement of this detecting unit when viewed from the side (in a horizontal direction with respect to the input surface) is similar to that shown in FIG. 3.

Figure 4:
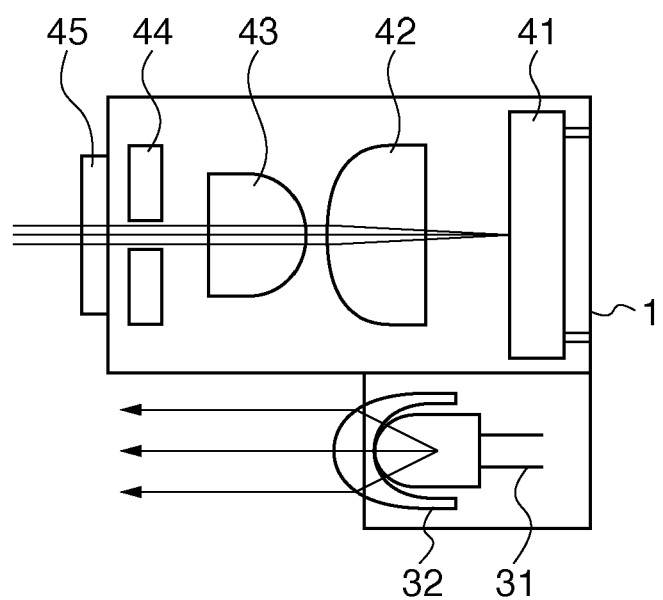
FIG. 4 is a view showing the arrangement of a sensor unit.

In the sensor unit 1, the light projecting unit and detecting unit are arranged to be stacked, and FIG. 4 is a side view of this arrangement (in a horizontal direction with respect to the input surface). The distance between optical axes of the light projecting unit and detecting unit can be set to fall within a range in which light can be sufficiently detected according to the angle characteristics of the retro-reflective portion.

Retro-reflective Portion

Figure 5:
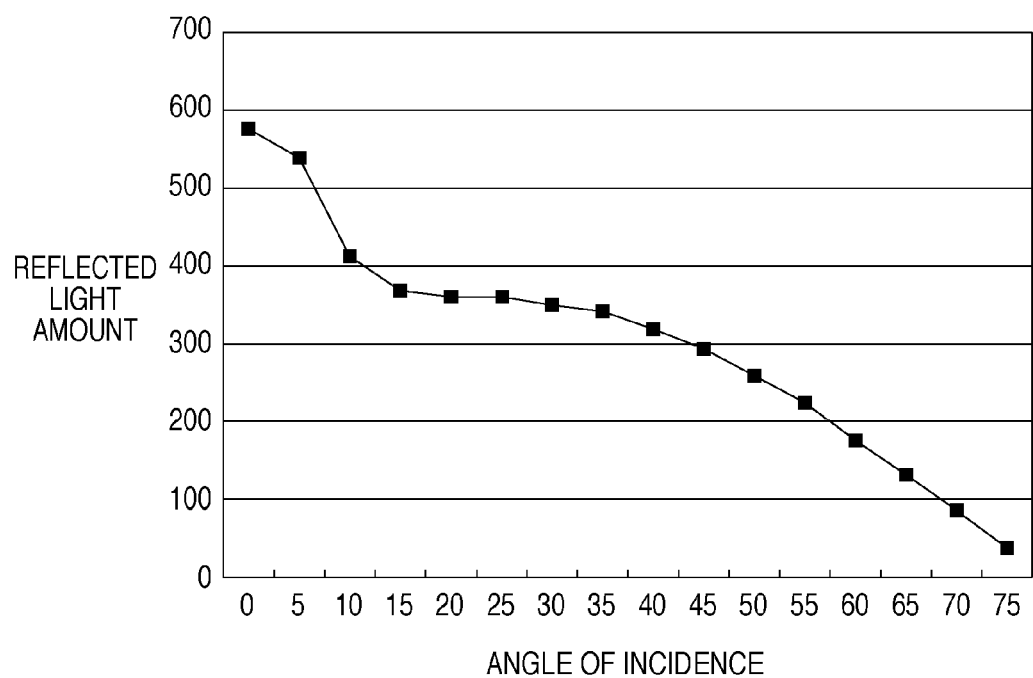
FIG. 5 is a graph showing retro-reflective characteristics.

The retro-reflective portion 3 will be described below. A retro-reflective member of the retro-reflective portion 3 has characteristics to reflect light in a direction of incidence of the light. When the retro-reflective member is flat, and when an angle of a reflected light from the retro-reflective member exceeds 45°, a reflected light amount decreases, as shown in FIG. 5. In this case, a change in light amount cannot be sufficiently measured even if an interrupting object exists.

In general, the reflected light amount is decided based on a light amount distribution (an illumination intensity and distance), a reflectance (an angle of incidence and a width of a reflective member) of the reflective member, and an imaging system illuminance (cosine fourth law). Therefore, when the reflected light amount is insufficient, the illumination intensity may be raised. However, when a reflection distribution is not uniform, some pixels of the CCD 41 of each detecting unit may be saturated upon reception of strong reflected light. Therefore, there is a limit to raise the illumination intensity. That is, by setting the reflection distribution of the reflective member as uniform as possible, an light amount can be increased at a portion where weak reflected light is received.

Main Unit

The arrangement and control of the main unit 2 will be described in detail below. Between the main unit 2 and sensor units 1 shown in FIG. 1, CCD control signals, CCD clock signals, CCD output signals, and LED driving signals are exchanged.

Figure 6:
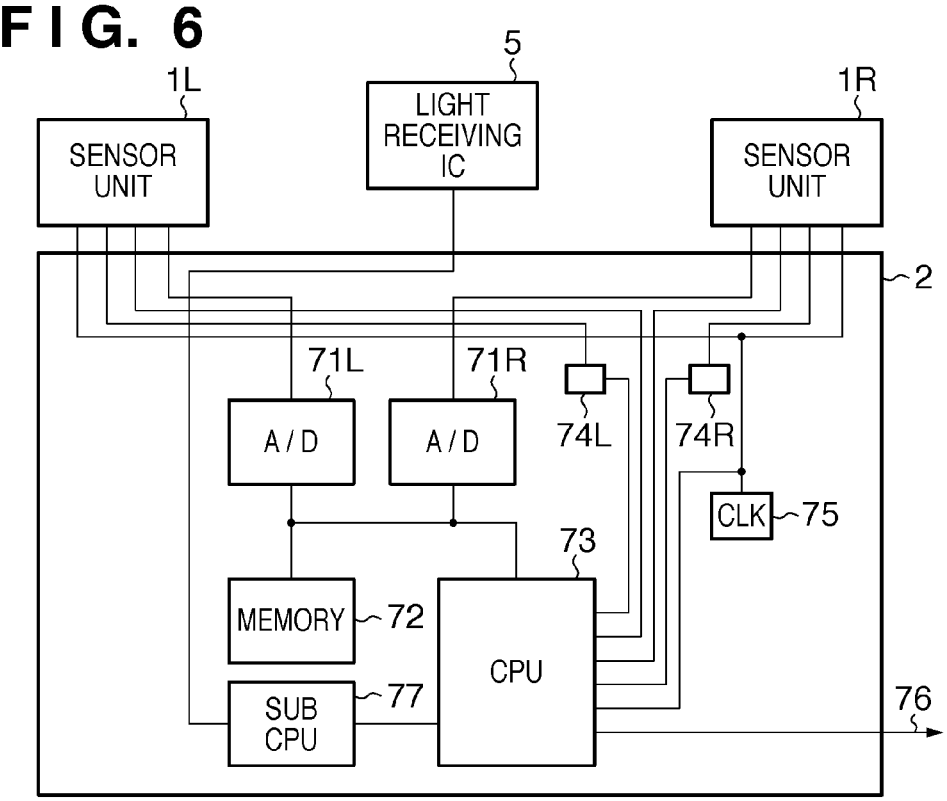
FIG. 6 is a block diagram showing the arrangement of a main unit.

FIG. 6 is a block diagram showing the arrangement of the main unit 2. The CCD control signals are output from an arithmetic control circuit (CPU) 73 including a one-chip microcomputer to implement shutter timing control and data output control of the CCDs 41. The CCD clock signals are sent from a clock generation circuit 75 to the sensor units 1, and are also input to the CPU 73 to attain various kinds of control in synchronism with the CCDs 41. The LED driving signals are supplied from the CPU 73 to the infrared LEDs 31 in the light projecting units of the sensor units 1 via LED driving circuits 74R and 74L.

Detection signals from the detecting units (CCDs 41) of the sensor units 1R and 1L are respectively input to A/D converters 71R and 71L of the main unit 2, and are converted into digital values under the control of the CPU 73. The converted digital values are stored in a memory 72 including, for example, a RAM, and are used in calculations of angles of an input point (to be referred to as input angles hereinafter) (to be described later). A coordinate value on the input area 4 is calculated from the input angles calculated in this way, and that information is output to, for example, an external PC via a serial interface 76.

The light receiving IC 5, which receives a signal based on light emitted by the pen 6, outputs a digital signal obtained by demodulating a modulated signal from the pen 6, and the digital signal is input to a sub CPU 77 serving as a pen switch signal detection circuit. A signal analyzed by the sub CPU 77 is transferred to the CPU 73. From the CPU 73, a logical product of the LED driving signals to the LED driving circuits 74R and 74L is input.

Light Amount Distribution Detection Processing

The light amount distribution detection processing of the sensor units 1 of this embodiment will be described in detail below.

Figure 7:
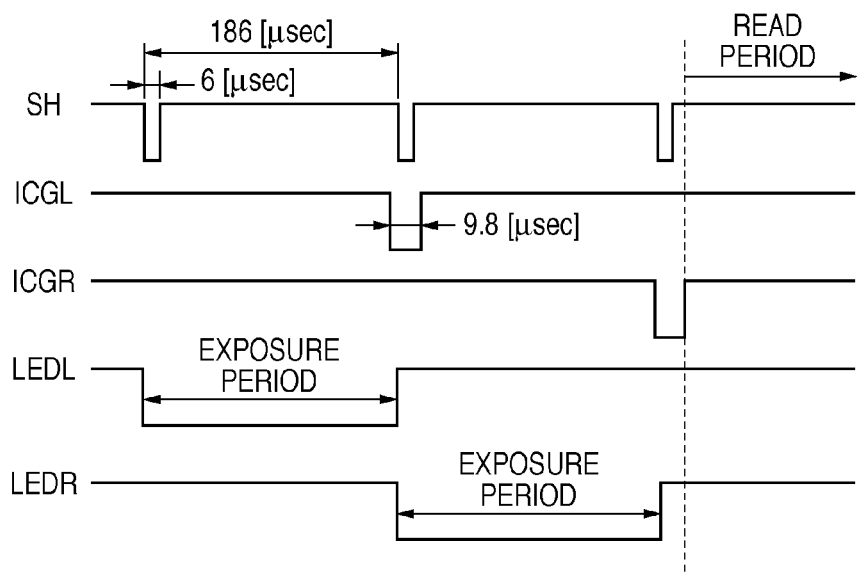
FIG. 7 is a timing chart of various control signals during a light emission cycle required for coordinate acquisition.

FIG. 7 is a timing chart of various control signals during a light emission cycle required for coordinate acquisition. Referring to FIG. 7, reference symbols SH, ICGR, and ICGL denote CCD control signals. Reference symbol SH denotes a shutter control signal, and a CCD shutter release time is decided based on the interval of this signal. Reference symbols ICGR and ICGL respectively denote gate signals to the right and left sensor units 1R and 1L. These gate signals ICGR and ICGL are used to control transfer timings of charges of photoelectric conversion units in the CCDs to read units.

Reference symbols LEDR and LEDL respectively denote driving signals of the right and left LEDs. In order to turn on one LED in the first interval of the SH signal, the driving signal LEDL is supplied to that LED via the LED driving circuit 74L. In the next interval of the SH signal, the other LED is driven. After completion of driving of the two LEDs, signals of the CCDs 41 are read out from the right and left sensor units 1R and 1L.

When there is no input by the pen 6, a light amount distribution 8a shown in FIG. 8 is obtained as the output from each of the right and left sensor units 1 from the signals read out from the CCDs 41. In FIG. 8, the ordinate plots the light amount which includes a maximum light amount level A and a minimum light amount level B. Also, the abscissa plots angles of incidence to each CCD 41, that is, pixel numbers. As can be seen from FIG. 8, a level obtained in a state without any reflected light is around B, and the level becomes closer to A with increasing reflected light amount. Data output from each CCD 41 in this way is sequentially A/D-converted, and is fetched as digital data by the CPU 73. Note that the light amount distribution shown in FIG. 8 is not always obtained in all systems. The distribution may change depending on the characteristic of the retro-reflective member, LED characteristics, and aging (for example, contamination of the reflective surface).

When the user makes an input using the pen 6 in a state in which the light amount distribution 8a is obtained, that is, when he or she interrupts reflected light by the pen 6, a light amount distribution 8b is obtained. As can be seen from FIG. 8, a portion C corresponds to a portion where the reflected light is interrupted by the pen 6, and the light amount of that portion drops. In this embodiment, an input point is detected based on such change in light amount distribution. More specially, an initial state without any pen input, corresponding to 8a, is stored in advance, and whether a change occurs or not is detected based on a difference from the initial state during each sample period. When the change has occurred, the changed portion is determined as a input point, and arithmetic operations for deciding input angles are made, as will be described later.

Input Angle Calculation Processing

Before calculations of input angles, a light-interrupted range has to be detected. As described above, since the light amount distribution changes due to, for example, aging, the initial state without any pen input is desirably stored at the startup timing of the system. Then, for example, even when the retro-reflective surface is contaminated, the system can be used except for a case in which the surface does not reflect any light.

The processing of one sensor unit 1 will be described below. It is noted that also the other sensor unit executes the same processing.

Upon power-ON, a light amount distribution obtained by A/D-converting an output from the CCD 41 without any pen input and light projected from the light projecting unit is stored in the memory 72 as Bas_data[N]. This data includes variations of, for example, a bias of the CCD 41, and is close to the level B in FIG. 8. Note that N is a pixel number, and pixel numbers corresponding to an effective input range are used. Next, a light amount distribution is detected while light is projected by the light projecting unit, and is stored in the memory 72 as Ref_data[N]. This data Ref_data[N] is that expressed by the solid line of 8a. Using the data Bas_data[N] and Ref_data[N] stored in the memory 72, whether or not an input is made, that is, whether or not a light-interrupted range exists, is determined.

Letting Norm_data[N] be light amount distribution data obtained during a certain sample period, the input angle calculation method of this embodiment will be described below.

In order to specify the light-interrupted range, the presence/absence of a pen input is determined based on an absolute amount of a change in light amount distribution data. This is to prevent a determination error caused by, for example, noise, and to detect a change of a predetermined amount securely. More specifically, an absolute amount of a light amount distribution change (absolute change amount Norm_data_a[N]) is calculated for each pixel by:

$$\text{Norm\_data\_}a[N] = \text{Norm\_data}[N] - \text{Ref\_data}[N] \tag{1}$$

The calculated absolute change amount Norm_data_a[N] is then compared with a threshold Vtha, which is decided in advance.

When there are more pixels than a predetermined number, whose absolute change amount Norm_data_a[N] exceeds the threshold Vtha, are detected, the presence of a pen input is determined. Since this input presence/absence determination processing is simple, it can be executed at high speed.

FIG. 9 illustrates a pen input state of this embodiment. Referring to FIG. 9, reference numeral 111 denotes a retro-reflective surface. Assume that a reflectance of an area A of this retro-reflective surface 111 is low due to, for example, contamination. A light amount distribution Ref_data[N] in this case includes a smaller reflected light amount in the area A, as shown in a distribution 10a in FIG. 10. Assume that a pointing device such as the pen 6 is inserted when in this state, as denoted by reference symbol C in FIG. 9, and covers nearly a half of the retro-reflective member. Then, since the reflected light amount is nearly halved, a light amount distribution Norm_data[N] indicated by a bold line in a distribution 10b in FIG. 10 is observed.

When the arithmetic operation given by equation (1) above is made for the states shown in FIG. 10, an absolute change amount Norm_data_a[N] (11a) is obtained, as shown in FIG. 11. Note that the ordinate in FIG. 11 plots a voltage difference from the initial state. When the threshold Vtha is applied to the data 11a, input falling outside the original input range may be detected. Of course, when the threshold Vtha is decreased, the detection precision is raised slightly, but the detection result may suffer the influence of, for example, noise. Hence, in this embodiment, in order to detect an input point with higher precision, a change amount ratio is used.

As shown in FIG. 10, since the reflected light amounts of both areas A and B are half before an instruction is input, a change amount ratio Norm_data_r[N] is calculated by:

$$\text{Norm\_data\_}r[N] = \text{Norm\_data\_}a[N]/(\text{Bas\_data}[N] - \text{Ref\_data}[N]) \tag{2}$$

The change amount ratio Norm_data_r[N] is calculated by equation (2). The Norm_data_r[N] (11b) is shown in FIG. 11. In this manner, in this embodiment, since the light amount distribution is expressed as its variation ratio, even when the reflective surface 111 has different reflectances depending on areas, all the areas can be equivalently handled. Therefore, an input point can be detected at high precision.

Figure 12:
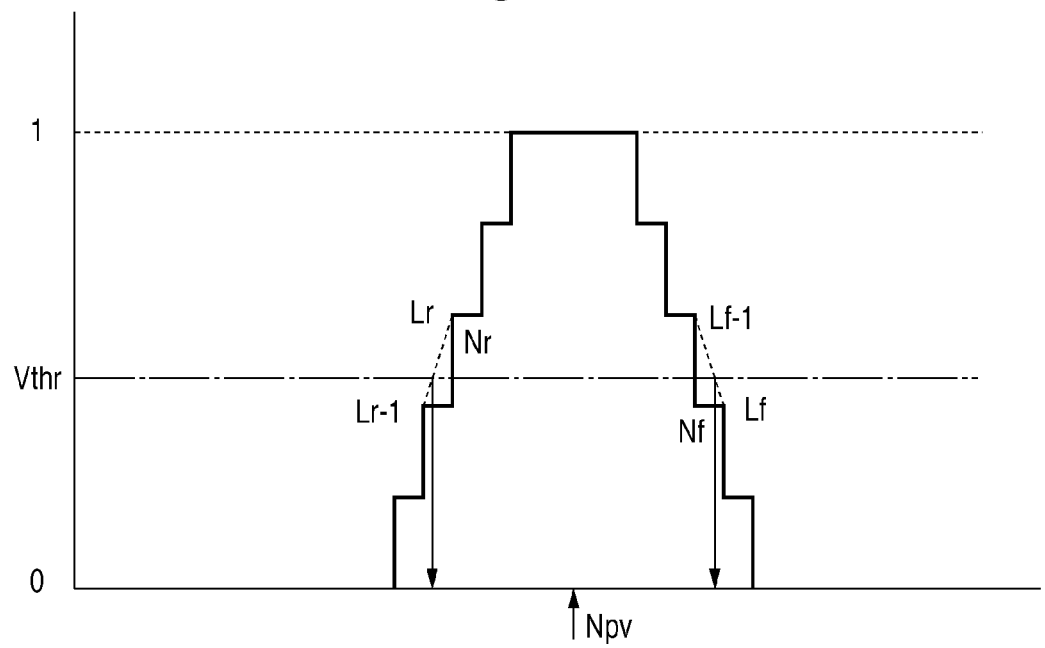
FIG. 12 is a graph showing a detection example of an input pixel position.

Next, by applying a threshold Vthr to the change amount ratio Norm_data_r[N] which is calculated by equation (2), as graph 11b, pixel numbers of leading and trailing edge portions of that data are specified. Then, the center between the leading and trailing edge portions is used as an input pixel to calculate its input angle. Note that FIG. 11 is illustrated for the descriptive purpose, and such leading edge may not appear in practice. In practice, respective pixels have different levels. FIG. 12 shows a detection example of an input pixel using the threshold Vthr. In this example, at the leading edge portion of the light-interrupted area, the Nr-th pixel exceeds the threshold Vthr and the Nf-th pixel falls below the threshold Vthr. At this time, a central pixel Np may be calculated by:

$$Np = Nr + (Nf - Nr)/2 \tag{3}$$

In this case, a resolution corresponding to a minimum pixel interval is set.

In this case, in order to attain more precise detection, pixel levels of the leading and trailing edges and those immediately before these levels are used. More specifically, imaginary pixel numbers which intersect the threshold Vthr are calculated. For example, let Lr be the level of the Nr-th pixel, and Lr−1 be the level of the (Nr−1)-th pixel. Also, let Lf be the level of the Nf-th pixel, and Lf−1 be the level of the (Nf−1)-th pixel. Then, their imaginary pixel numbers Nrv and Nfv are respectively calculated by:

$$Nrv = Nr - 1 + (Vthr - Lr - 1)/(Lr - Lr - 1) \tag{4}$$

$$Nfv = Nf - 1 + (Vthr - Lf - 1)/(Lf - Lf - 1) \tag{5}$$

Then, an imaginary central pixel Npv is decided by:

$$Npv = Nrv + (Nfv - Nrv)/2 \tag{6}$$

By calculating imaginary pixel numbers from the pixel numbers and their levels, detection with a higher resolution can be attained.

Figure 13:
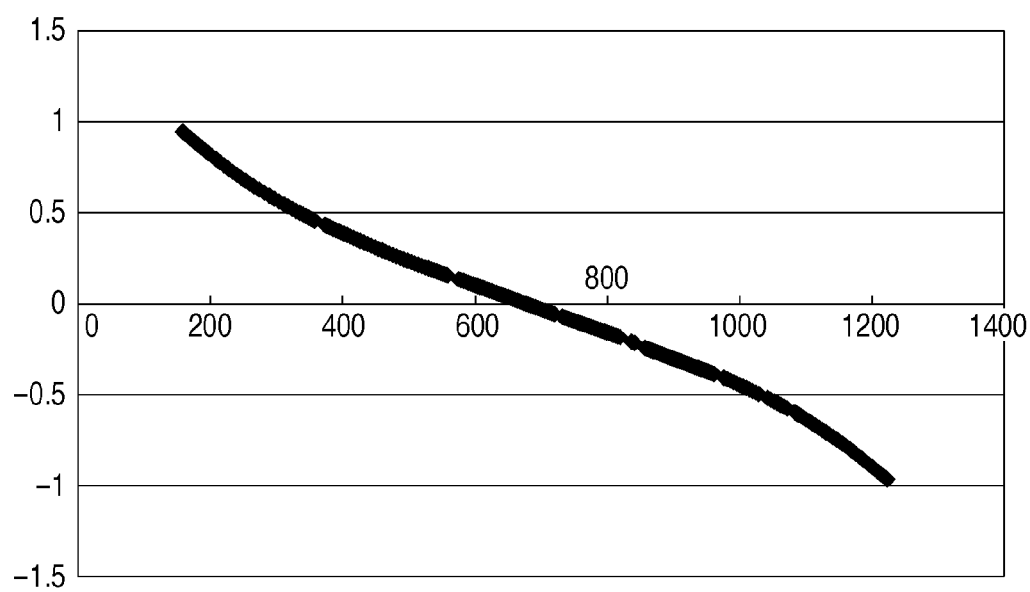
FIG. 13 is a graph showing the relationship between pixel numbers and angles.

In order to calculate an actual coordinate value from the central pixel number obtained as described above, the central pixel number is required to be converted into angle information. FIG. 13 shows the relationship between the pixel numbers and angles. In FIG. 13, the abscissa plots the pixel numbers, and the ordinate plots the angles. As can be seen from FIG. 13, each pixel number is nearly proportional to an angle from the lens center.

In this case, it is known that an actual pixel number has an error of about 0.2° from a true detection angle. In order to correct this error without changing the lens configuration, a correction is made using an approximate polynomial given by:

$$\theta = Tn \cdot e^n + T(n-1) \cdot e^{(n-1)} + T(n-2) \cdot e^{(n-2)} + \ldots + T0 \tag{7}$$

where e is a pixel number, n is an order, and Tn is a coefficient of each order. Note that an optical system of the sensor unit 1 has f-θ characteristics.

In equation (7), the order n may be decided in consideration of, for example, a required precision specification and calculation performance. Also, it is desirable to decide the coefficients Tn for each device since they depend on lens and assembling variations. More specifically, for a sensor unit with a decided set of lenses and a CCD, pixel numbers corresponding to a plurality of given angles are measured. Then, the coefficients Tn are decided using, for example, a least square method for the measured data. The decided coefficients Tn may be stored for each device. That is, approximate polynomial (7) for correction is calculated and stored for each sensor unit with letting a point assumed as a lens center to be zero point, when the sensor unit is assembled for example.

However, when the sensor unit is actually attached to the coordinate input apparatus, it is difficult to accurately set the lens center for each device to fit a zero direction of the input area 4. In this case, by performing a correction using a correction formula for a pixel number and angle θ, the pixel numbers and angles can be corrected to have a linear relationship, unlike tan θ characteristics and the like. That is, a difference value for an angle indicates the same angle difference irrespective of areas and pixel positions. Hence, which pixel on the CCD 41 corresponds to an input of the central point of the input area 4 is stored at the time of detection. Then, subsequent detection values are calculated based on differences from this value, thus compensating for attachment errors. That is, when the sensor unit is attached, an input to the center (reference point) of the input area 4 is made. Then, a pixel number where that point is detected, or angle data according to correction formula (7) above is stored in a nonvolatile memory (not shown) as reference point data. This reference point data is read out at, for example, the power-ON timing, and is used in subsequent coordinate calculations.

In coordinate calculation processing to be described later, it is convenient to calculate a tangent value of an angle θ in place of the angle θ itself. Conversion from the angle θ to tan θ uses a table or conversion formula. In this case, the aforementioned reference point data for attachment error correction of the sensor unit 1 is used. That is, a central angle θc is calculated first by:

$$\theta c = \theta pv - \theta org \tag{8}$$

where θorg is an angle as the stored reference point data, and θpv is an imaginary central angle calculated using equation (7).

In order to convert the central angle θc obtained by equation (8) into Tan θc, a series expansion formula such as Maclaurin expansion may be used. The series expansion formula is given by:

$$\operatorname{Tan} \theta c = \theta c + \tfrac{1}{3}\cdot\theta c^{3} + \tfrac{2}{15}\cdot\theta c^{5} + \tfrac{17}{315}\cdot\theta c^{7} + \tfrac{62}{2835}\cdot\theta c^{9} \tag{9}$$

Tan θc obtained in this way is detected as input angle information.

Coordinate Calculation Processing

Processing for calculating a coordinate value from the angle data Tan θc obtained in correspondence with the pen input position will be described below. FIG. 14 is a view showing the positional relationship between the sensor units 1R and 1L and screen coordinates. The sensor units 1R and 1L are respectively set at the right and left ends of the bottom side of an input range, and a distance between these sensor units is Ds. The screen center is an origin position of the screen. P0 is an intersection between directions for the sensor units 1R and 1L with an angle of 0°, and P0Y is a distance between the intersection P0 and origin. Let θR and θL be angles respectively detected by the sensor units 1R and 1L with respect to a position of a pen input. tan θR and tan θL of these angles are respectively calculated using polynomial (9) above. Then, x and y coordinates of a point P are respectively calculated by:

$$x = Ds \cdot (\tan \theta L + \tan \theta R)/(1 + (\tan \theta L \cdot \tan \theta R)) \tag{10}$$

$$y = -Ds \cdot (\tan \theta R \cdot \tan \theta L (2 \tan \theta L \cdot \tan \theta R)/(1 + (\tan \theta L \cdot \tan \theta R)) + P0Y \tag{11}$$

Control Sequence of Coordinate Input Processing

Figure 15:
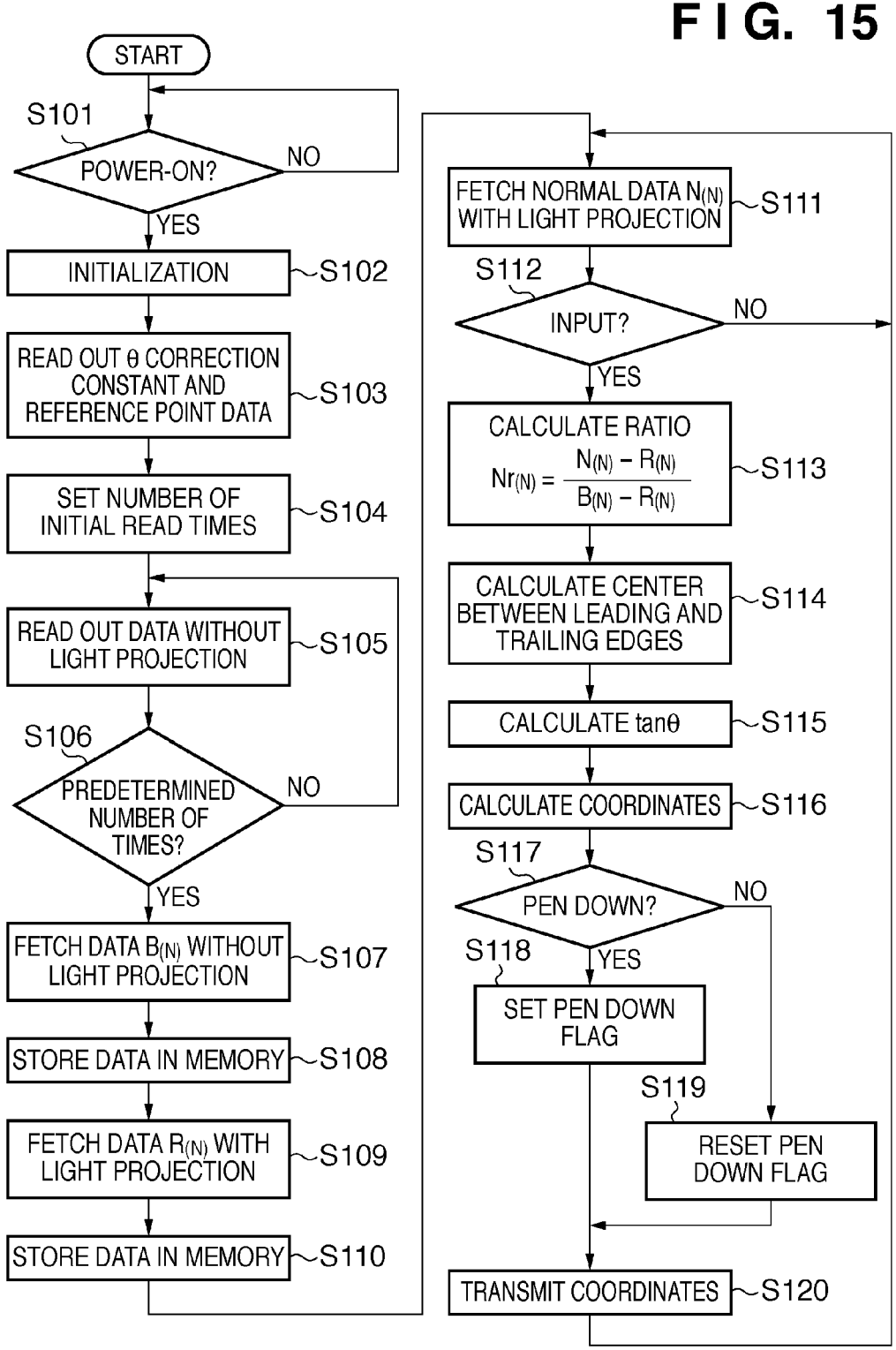
FIG. 15 is a flowchart showing coordinate input processing.

The respective processes associated with coordinate input processing in the coordinate input apparatus of this embodiment have been explained. The sequence of the coordinate input processing will be described below using FIG. 15. FIG. 15 is a flowchart showing steps from power-ON up to coordinate calculations in the coordinate input apparatus.

In step S101, the CPU 73 waits until the power supply is turned on. After the power supply is turned on, the process advances to step S102, and the CPU 73 executes various initialization processes such as port settings and timer settings.

After that, in step S103 respective θ correction constants are read out from the nonvolatile memory (not shown), and are stored in the memory 72 of the main unit 2. Also, the reference point data θorg acquired at the time of attachment of each sensor unit is read out from the nonvolatile memory (not shown), and is stored in the memory 72.

In steps S104 to S106, initial processing for removing unnecessary charges of the CCDs 41 is executed. In general, in a photoelectric conversion element such as a CCD, unnecessary charges are often accumulated during a non-operation period. In such case, when detection data from each CCD is used intact as reference data, the apparatus generates a detection error, or it becomes impossible to detect any input. Hence, at the startup timing of the apparatus, data read operations from the CCDs 41 of the sensor units 1 are performed a plurality of times without any light projection. In step S104, the number of read times is set. In step S105, data is read out without any light projection to remove unnecessary charges. In step S106, the process in step S105 is repeated the predetermined number of times.

After completion of the unnecessary charge removal processing, light amount distribution data B(N) without any light projection is fetched as reference data from each sensor unit 1 in step S107. In step S108, the fetched data is stored in the memory 72. This data B(N) corresponds to Bas_data[N] in equation (2) above.

Initial light amount distribution data R(N) upon projecting light is fetched as another reference data in step S109, and is stored in the memory 72 in step S110. This data R(N) corresponds to Ref_data[N] in equation (1) above.

The processes executed so far correspond to initial setting operations upon power-ON. After that, a normal input operation is started.

In step S111, data N(N) with light projection is fetched from each sensor unit 1. In step S112, the presence/absence of a light-interrupted portion is determined based on a difference value (R(N)−N(N)) between the data N(N) and R(N). More specifically, if the difference value is equal to or larger than a predetermined value, the presence of an input is determined. If the absence of a coordinate input is determined, the process returns to step S111 to fetch data again. If this repetition interval is set to be about 10 msec, 100 sampling operations per sec are executed.

If the presence of a light-interrupted portion, that is, an input is determined in step S112, the process advances to step S113. In step S113, a change amount ratio Nr(N) of the light amount distributions is calculated, as described above using equations (1) and (2). That is, the change amount ratio Nr(N) of the light amount distributions is calculated by:

$$Nr(N) = (N(N) - R(N))/(B(N) - R(N)) \tag{12}$$

In step S114, a predetermined threshold is applied to the change amount ratio Nr(N) obtained in step S113 to decide its leading and trailing edge positions. Then, a central position of these positions is calculated. This process is executed based on equations (4), (5), and (6) above. For the central position calculated in this way, an imaginary central angle θpv is calculated based on equation (7) above using the coefficients loaded previously. Furthermore, the imaginary central angle θpv is corrected using equation (8) to give a central angle θc. Then, in step S115 Tan θ is calculated using equation (9) from the central angle θc obtained in step S114. Note that the processes in step S113 to S115 are respectively executed for the right and left sensor units 1R and 1L. That is, for each sensor unit 1, Tan θ as angle information according to an input point is calculated. In step S116, x and y coordinates are calculated using equations (10) and (11) from the data Tan θ in the right and left sensor units 1R and 1L, which are calculated, as described above.

After the input coordinate value is calculated in this way, the presence/absence of an input instruction by the pen 6 is determined in step S117. That is, whether or not the pen 6 is in a pen down state, in which the pen 6 touches the input area 4, is determined. The pen 6 transmits a light signal indicating ON/OFF of, for example, a pen tip switch. The sub CPU 77 detects this light signal via the light receiving IC 5, and outputs the detection result to a port (not shown). According to this pen down detection result, a pen down flag is set (S118) or reset (S119). That is, if the pen down state is detected, the pen down flag is set in step S118. If the pen down state is not detected, that is, a pen up state is detected, the pen down flag is reset in step S119.

After the input coordinate value and pen down flag indicating the down state are decided, as described above, these data are finally transmitted to a host PC (not shown) in step S120. This transmission is made via an arbitrary interface such as a serial interface (for example, USB or RS232). In the PC which received these data, a driver interprets the received data. Then, the driver executes a cursor movement operation, mouse button state change operation, and the like, based on the obtained input coordinate value and the pen down flag. In this way, based on an instruction input at the coordinate input apparatus, a PC screen can be operated. After completion of the process in step S120, the process returns to step S111, and the processes shown in this flowchart are repeated until the power supply is turned off.

Pen for Coordinate Input Apparatus

As described above, the coordinate input apparatus of this embodiment allows to make an input with "finger". However, when an input is made using a pointing device such as the pen 6, operations corresponding to various buttons of a mouse can be made. The arrangement of the pen 6 of this embodiment will be described in detail below using FIG. 16.

The pen 6 which imitates a writing tool includes a pen tip switch 61 (to be referred to as a pen tip SW hereinafter) which is switched on by pressing a pen tip portion of the pen 6, and a plurality of pen side switches 62 (to be referred to as pen side SWs hereinafter) arranged on the side surface of a housing. Also, the housing of the pen 6 includes a CPU 64 as a controller, a timer 65, and a battery 66. When one of the pen tip SW 61 and the plurality of pen side SWs 62 is set in a down state, a signal is transmitted in synchronism with a predetermined transmitting interval generated according to timekeeping by the timer 65.

In this case, the down state of the pen tip SW 61 represents a state in which the coordinate input pen 6 is brought into contact with and is located on the input area 4 of, for example, a display as a coordinate input surface, that is, a state in which an operator is about to make a coordinate input and to input a stroke. Also, for example, when the pen tip SW 61 is operated twice within a predetermined time period, these operations are recognized as double-clicking operations of a mouse.

Figure 16:
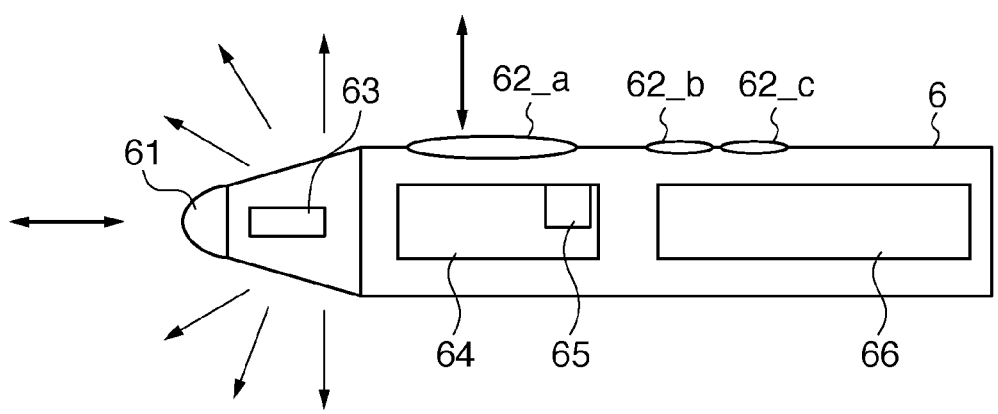
FIG. 16 is a block diagram showing the arrangement of a pointing device (pen)

The down state of each pen side SW 62 represents a state in which the pen side SW 62 is physically pressed. As shown in FIG. 16, the pen 6 includes three pen side SWs 62_a, 62_b, and 62_c. For example, functions can be assigned to these SWs like that a function of a right button of a mouse is assigned to one SW, and a function of an up or down scroll button is assigned to another SW.

A signal transmitted at the time of the pen down state (to be referred to as a switch signal hereinafter) is generated in accordance with the states of the pen tip SW 61 and pen side SWs 62 detected by the CPU 64, and device identification information. For example, the switch signal generated based on a timing signal, up/down information of the switches, and device identification information is transmitted by light emitted by an infrared LED 63 at each predetermined transmitting interval generated according to timekeeping by the timer 65.

As this transmission method, signals indicating the up/down information of the switches and the device identification information are superposed on a light signal radiated by the pen 6 as a timing signal. Then, upon transferring this information, a leader part including, for example, a continuous pulse train, and a subsequent header part including a code (for example, manufacturer ID) are output first. After that, a transmission data sequence including, for example, a control signal from the pen tip SW 61 is sequentially output according to an order and format which are defined in advance. Note that such transmission method based on an optical communication is known in, for example, a remote control apparatus using infrared rays, and a detailed description thereof will not be given.

When the light signal (switch signal) transmitted from the pen 6 in this way is received by the light receiving IC 5 shown in FIG. 6, the sub CPU 77 determines which of the switches of the pen 6 is operated. Then the CPU 73 begins to exchange the CCD control signals, CCD clock signals, and LED driving signals between the sensor units 1R and 1L according to the determination result.

Switch Signal Detection Processing

Figure 17:
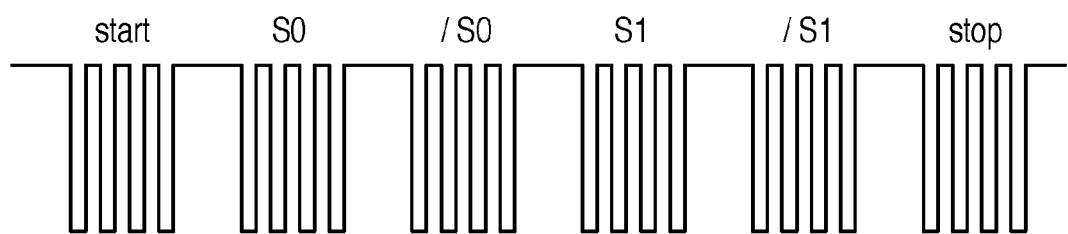
FIG. 17 is a chart showing an example of a switch signal by the pen.

The detection processing of the switch signal transmitted from the pen 6 in this embodiment will be described in detail below. The switch signal including switch information and device identification information is a light signal, which is modulated at a predetermined frequency f, so as to be insusceptible to, for example, a disturbance. FIG. 17 shows an example of the switch signal. As shown in FIG. 17, the switch signal includes start bits indicating the start of data, a pen tip SW signal S0, a pen side SW signal S1, inverted signals /S0 and /S1 of the signals S0 and S1, which are used to determine authenticity of the data, and stop bits indicating the end of the data. These signals are respectively modulated at the frequency f.

FIG. 18 shows an overview of switch signal detection. As shown in FIG. 18, modulated light as the switch signal is received by the light receiving IC 5. Then, the signal is demodulated by the sub CPU 77, and is input as a bit sequence to the CPU 73. The pulse width of this demodulated signal is often different from the width of modulated waves depending on, for example, the characteristics of the light receiving IC 5. An input pulse width is 10 μsec, while the demodulated signal often has a pulse width of several ten μsec, although it depends on an incoming light level.

Upon detection of the start bits at the head of the switch signal, the sub CPU 77 executes sampling operations at predetermined intervals. Then, the sub CPU 77 determines 1/0 of respective bit positions to check whether or not logics of, for example, the signals /S0 and /S1 are proper and whether or not the stop bits are detected. If the logics are proper, the sub CPU 77 outputs a result. If the logics are improper, the sub CPU 77 discards that switch signal, and detects a switch signal again.

Simultaneous Input Control Using Plural Pens

In the coordinate input apparatus of this embodiment, users may make simultaneous input operations to a plurality of points using a plurality of pens 6 as pointing devices. Prior to a description of the simultaneous input control using a plurality of pens according to this embodiment, problems which may be posed when a plurality of pens are simultaneously used in a conventional coordinate input apparatus will be explained.

FIG. 19 is a timing chart showing an input by a conventional pen. Reference numeral 2101 denotes a switch down signal which represents a down state of the pen tip SW or one of the pen side SWs; and 2102, an emission timing signal. During each of a plurality of emission timings, light is emitted in accordance with the switch signal as shown in FIG. 17 or FIG. 18. As can be seen from the emission timing signal 2102 shown in FIG. 19, a light emission is started in synchronism with the start of the switch down signal 2101.

In this case, a plurality of pens are assumed, and let ID1 and ID2 be respective pieces of device identification information of these pens. FIG. 20 is a timing chart showing inputs by a plurality of conventional pens. Reference numerals 2201 and 2202 respectively denote switch down signals, each of which represents a down state of the pen tip SW or one of the pen side SWs, of the pens with ID1 and ID2. Reference numerals 2203 and 2204 denote emission timing signals of the respective pens. As can be seen from these emission timing signals 2203 and 2204, different emission timings of the plurality of pens are set for the respective IDs, that is, the respective pens.

When these two pens are used in input operations, if the switch down states of these pens are generated at the same timing, light emissions of these pens are done at the same timing, as indicated by a double-headed arrow a in FIG. 20. Therefore, superposition of signals occurs. In this case, the light receiving IC 5 and the sub CPU 77, which receive the light signals, cannot determine the pens with ID1 and ID2, which emitted light. For this reason, device identification IDs of the pens cannot be assigned to a plurality of coordinates calculated using equations (10) and (11). Note that since the pens with ID1 and ID2 are set to have different light emission cycles, a correct light signal can be acquired at the next emission timing (for example, b in FIG. 20 in case of the pen with ID1). However, coordinates are output to be delayed from the switch down timing. Furthermore, this delay is generated every time users begin to write at the same time using the plurality of pens. Therefore, such delay results in unnatural user operations.

In this embodiment, in order to avoid such trouble, the timer 65, which generates the light emission cycle of the pen 6, continuously holds that light emission cycle during a predetermined period even after the pen up state. That is, when a state with an input instruction by the pen 6 is changed to that without any input instruction, the timer 65 continues timekeeping of the emission timings in the state with the input instruction during a predetermined period.

FIG. 21 is a timing chart showing a pen input according to this embodiment. FIG. 21 shows a switch down signal 2301 and an emission timing signal 2302 according to a transmitting interval. As shown in FIG. 21, even during a period a in FIG. 21 after a pen up state of the pen tip SW 61 or one of the pen side SWs 62, the timer 65 holds the timings based on the emission timing signal 2302. That is, in the pen up state, the timer 65 continues timekeeping of the timing signal 2302. Note that this continuation is made within a predetermined holding period. When the next switch down event occurs during the holding period, light is emitted in synchronism with the emission timing (b in FIG. 21) in accordance with the continued timekeeping by the timer 65, rather than immediately after the switch down event. That is, continuous transmission is started.

FIG. 22 is a timing chart when two pens 6 of this embodiment, which hold emission timings for a predetermined time period, are used at the same time. Referring to FIG. 22, reference numerals 2401 and 2402 denote switch down signals, each of which indicates a down state of the pen tip SW or one of the pen side SWs, of the pens with ID1 and ID2. Reference numerals 2403 and 2404 denote emission timing signals of these pens. When the switch down events of the plurality of pens simultaneously occur at a timing a shown in FIG. 22, light emissions are made in synchronism with light emission cycles respectively held by the timers 65 of these pens. That is, the first light emission after the switch down event of the pen with ID1 takes place at a timing b in FIG. 22, and that of the pen with ID2 takes place at a timing c in FIG. 22. For this reason, light signals emitted by the two pens are detected by the light receiving IC 5 and sub CPU 77 without being superposed with each other. After that, the sub CPU 77 can correctly acquire pieces of switch information and device identification information of the respective pens.

In this embodiment, the timer 65 of the pen 6 continuously holds the emission timings even after interruption of transmission due to a pen up event. In this way, the number of times of superposition of light emission signals of the plurality of pens can be greatly reduced. Therefore, a response when users simultaneously begin to write using a plurality of pens can be improved.

Note that the first emission timings of a plurality of pens after their switch down events may incidentally overlap each other depending on the light emission cycles to be set. In such case, even during a period in which the emission timing is held, signals are unwantedly superposed with each other in response to switch down events at that timing. However, such timing only comes every least common multiple of the light emission cycles set for respective pieces of device identification information of the pens. Furthermore, the frequency of occurrence of that timing is not so high since it occurs when the plurality of pens are used to make inputs at nearly the same time. It is estimated that the number of collision times upon holding the emission timings described using FIGS. 21 and 22 is about 1/10 or less of the conventional light emission method described using FIGS. 19 and 20.

As described above, since the plurality of pens hold emission timings for a predetermined time period, superposition of light emissions by the pens can be avoided at the time of simultaneous pen down events.

Note that when the holding period of the emission timing is extremely short, the response will not be improved significantly since such arrangement is nearly the same as that of the related art described using FIG. 19. On the other hand, when the emission timing is held over an extremely long time period, such long holding period influences the service life of the battery 66 in turn. It may be most effective to set about ten seconds as the emission timing holding period, so as to obtain the aforementioned effects. This holding period suffices in order to be effective in a situation in which, for example, users input characters using a plurality of pens during a meeting. Of course, this holding period need only be set in consideration of correlation with the battery service life of the pen, and is not limited to a range of several ten seconds. Also, the pen 6 may be provided with a change unit used to change this holding period. By setting the emission timing holding period, as described above, the battery service life can be maintained without any practical issue.

As described above, according to this embodiment, an immediately preceding emission timing is continuously held at the pen up timing of the pointing device. When a pen down event occurs during the emission timing holding period, light is emitted in synchronism with the held emission timing. In this way, even when users simultaneously make inputs using a plurality of pens, since the emission timings of these pens are respectively held, the number of collision times of their light emissions can be greatly reduced. In this way, the writing response at the beginning of writing can be improved.

Second Embodiment

The second embodiment of the present invention will be described below. Note that since the arrangement of a coordinate input apparatus according to the second embodiment is the same as that of the first embodiment described above, the same reference numerals denote the same parts as in the first embodiment, and a repetitive description thereof will be avoided. In the aforementioned first embodiment, since a plurality of pens hold their emission timings during a predetermined period, superposition of light emissions of the pens is avoided. On the other hand, a light projection required for coordinate acquisition from the coordinate input apparatus main body may affect detection of a pen switch signal.

As described above using FIG. 19, a light emission of a conventional coordinate input pen is started in response to a switch down event. For this reason, a light projection required for coordinate acquisition is not synchronized with a light emission of the pen, and they may often be superposed with each other. In this case, it becomes difficult to detect a switch signal. A sub CPU 77, which determines the state of the switch signal based on a demodulated signal, determines pressing of a switch, that is, a down state of a pen tip SW 61 (or that of one of pen side SWs 62) based on the presence/absence of the switch signal. For this reason, when the sub CPU 77 cannot obtain a light input corresponding to the switch signal, it determines a pen up state even during drawing. In such case, even during continuous drawing, a drawn line may be unwantedly interrupted.

Hence, in the second embodiment, the aforementioned problem is avoided by detecting, in advance, a superposition timing of a light projection required for coordinate acquisition and a pen light emission. In this way, this embodiment is characterized by allowing smooth drawing.

Figure 23:
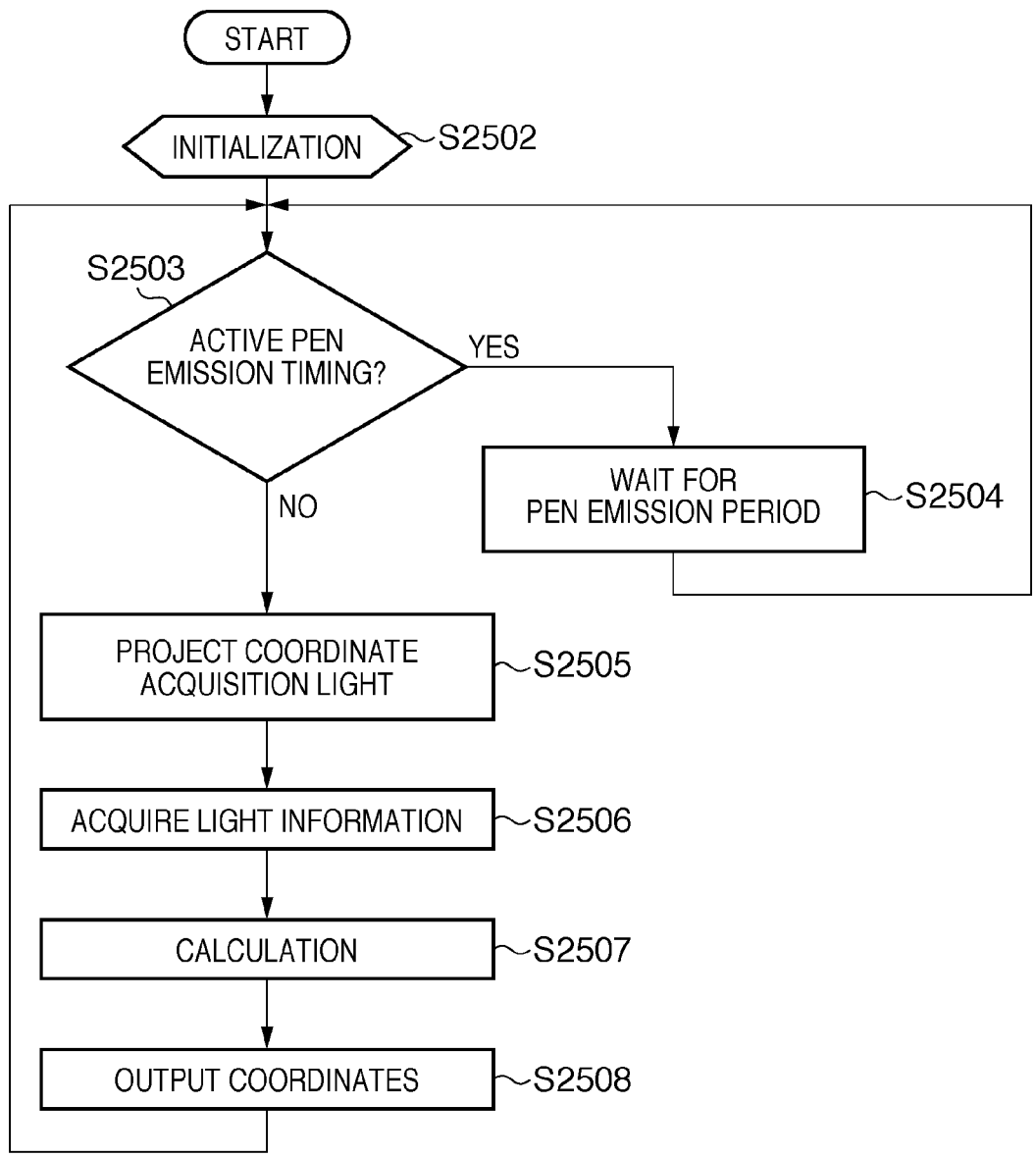
FIG. 23 is a flowchart showing coordinate acquisition processing according to the second embodiment.

FIG. 23 is a flowchart showing coordinate acquisition processing according to the second embodiment. After initialization processing of ports and timers in step S2502, coordinate acquisition detection loop processing is started.

In this loop, it is determined in step S2503 based on an emission timing signal of a pen whether or not the emission timing is active. In order to attain this determination step, a pen 6 holds the emission timing during a predetermined period even after a pen up event.

If it is determined in step S2503 that the pen emission timing is active, the control waits for the end of the pen light emission for a predetermined time period in step S2504. If the pen emission timing is not active, since there is no possibility of superposition with a pen light emission, a light projection required for coordinate acquisition is made in step S2505. The second embodiment avoids superposition of the light projection required for coordinate acquisition and pen light emission in this way.

After that, as in the first embodiment, pieces of light information are acquired from sensor units 1 in step S2506, input coordinates are calculated based on the pieces of light information in step S2507, and the calculated coordinates are output in step S2508.

FIG. 24 is a timing chart showing a pen input according to the second embodiment. FIG. 24 shows a switch down signal 2601, emission timing signal 2602, and light projection timing signal 2603.

The emission timing signal 2602 is synchronized with a light emission cycle held by a timer 65 in the pen 6. A CPU 73 fetches this emission timing signal 2602 via the sub CPU 77, and generates timing information synchronized with this signal (that is, a signal synchronized with the emission timing). Then, the CPU 73 can determine in advance whether or not the pen emission timing collides against the light projection timing for coordinate detection. The CPU 73 also controls the light projection timing for coordinate detection, that is, a light projection cycle. Hence, when the CPU 73 detects that the light projection timing collides against the pen emission timing, it shifts the light projection timing to that behind the pen emission timing. For example, a pen light emission and light projection collide against each other at timings a and c in FIG. 24. Then, these timings a and b are shifted to light projection timings b and d in FIG. 24 behind the end of the pen light emission. With this light projection control, superposition of the pen light emission and light projection can be avoided.

As described above, according to the second embodiment, since the pen holds a light emission cycle, a superposition timing of the pen light emission and light projection for detection can be detected in advance. By avoiding this superposition, a smooth input is allowed without any interruption of a line which is being drawn.

Note that the coordinate input apparatus main body performs a light projection operation even when no pen light emission is made. Therefore, as for an input of the first point in a state in which the pen does not hold any emission timing, the pen light emission and light projection may collide against each other. However, after that timing, superposition of the light projection for coordinate acquisition and the pen light emission can be avoided. Therefore, improvement of the response at the beginning of writing can be sufficiently expected.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-288416, filed on Dec. 18, 2009, which is hereby incorporated by reference herein in its entirety.

What is claimed is:

1. A coordinate input apparatus for making an input by bringing a pointing device into contact with an input area of an apparatus main body, said pointing device comprising:

a timer configured to generate a transmission cycle by timekeeping;

a detection unit configured to detect the presence/absence of an input instruction according to the presence/absence of contact of said pointing device with the input area; and a transmission unit configured to transmit information including the input instruction to the apparatus main body via an optical communication in accordance with the transmission cycle generated by said timer when said detection unit detects the presence of the input instruction, and to skip transmission to the apparatus main body when said detection unit detects the absence of the input instruction, wherein when said detection unit detects the absence of the input instruction, after having detected the presence of the input instruction, said timer continues timekeeping of the transmission cycle for a predetermined holding period, and when said detection unit detects a presence of the input instruction within the holding period after having detected the absence of the input instruction, said transmission unit performs transmission according to the transmission cycle generated based on timekeeping continued by said timer.

2. The apparatus according to claim 1, wherein said detection unit is further configured to detect the presence/absence of an input instruction generated upon pressing of a switch arranged on a side surface of said pointing device.

3. The apparatus according to claim 1, wherein said transmission unit is further configured to transmit at least information indicating the presence/absence of the input instruction and device identification information of said pointing device as the information including the input instruction.

4. The apparatus according to claim 3, further comprising a plurality of said pointing devices which respectively allow to make inputs to the input area, said plurality of pointing devices having different transmission cycles generated by the respective timers.

5. The apparatus according to claim 1, wherein said transmission unit performs transmission to the apparatus main body as the optical communication by emitting light according to the information including the input instruction.

6. The apparatus according to claim 5, further comprising:

a light projecting unit configured to perform a light projection to the input area;

a light receiving unit configured to detect a light amount distribution of reflected light as a result of the light projection to the input area;

a coordinate calculation unit configured to calculate a coordinate position where the reflected light is interrupted by said pointing device on the input area, based on a difference between the light amount distribution detected by said light receiving unit and a light amount distribution detected without any light projection; and a light projection control unit configured to control a light projection cycle so as to avoid the light projection by said light projecting unit from being superposed with a light emission of said transmission unit based on the information including the input instruction transmitted by said transmission unit from said pointing device.

7. The apparatus according to claim 6, wherein said light projecting unit and said light receiving unit are respectively arranged at each of two corners of the input area, and said light receiving unit detects a light amount distribution of reflected light obtained by retro-reflecting light projected from said light projecting unit by a peripheral portion of the input area.

8. A non-transitory computer-readable storage medium storing a program for controlling a computer to function as respective units of a coordinate input apparatus according to claim 1 when said program is executed by the computer.

9. A method for controlling a pointing device wherein an input is made by bringing the pointing device into contact with an input area of a main body of a coordinate input apparatus, wherein said pointing device comprises a timer configured to generate a transmission cycle by timekeeping, said method comprises the steps of:

detecting the presence/absence of an input instruction according to the presence/absence of contact of said pointing device with the input area;

transmitting information including the input instruction to the apparatus main body via an optical communication in accordance with the transmission cycle generated by said timer when the presence of the input instruction is detected, and skipping transmission to the apparatus main body when the absence of the input instruction is detected;

making the timer continue timekeeping of the transmission cycle for a predetermined holding period, when the absence of the input instruction is detected after having detected the presence of the input instruction; and transmitting according to the transmission cycle generated based on timekeeping continued by said timer, when a presence of the input instruction is detected within the holding period after having detected the absence of the input instruction.

\* \* \* \* \*